(12) United States Patent
Shung

(10) Patent No.: US 6,244,130 B1
(45) Date of Patent: Jun. 12, 2001

(54) GRIPPING DEVICE WITH A REPLACEABLE HEAD PORTION FOR USE ON GEAR SHIFT LEVER

(75) Inventor: Shun-Tian Shung, San Chung (TW)

(73) Assignee: Janchy Enterprise Co., Ltd., San Chung City Taipei (TW)

( * ) Notice: Subject to any disclaimer, the term of this patent is extended or adjusted under 35 U.S.C. 154(b) by 0 days.

(21) Appl. No.: 09/188,255

(22) Filed: Nov. 10, 1998

(51) Int. Cl.[7] .................................................... G05G 1/10
(52) U.S. Cl. .......................... 74/543; 16/441; 16/DIG. 30
(58) Field of Search ........................ 74/543, 523; 16/441, 16/DIG. 30

(56) References Cited

U.S. PATENT DOCUMENTS

| | | | | |
|---|---|---|---|---|
| 129,458 | * | 7/1872 | Carpenter | 16/DIG. 30 |
| 409,267 | * | 8/1889 | Allen | 74/543 |
| 1,548,197 | * | 8/1925 | Kendall et al. | 74/543 |
| 1,701,776 | * | 2/1929 | Hinman | 16/441 |
| 1,795,280 | * | 3/1931 | Parks | 74/543 |
| 3,484,808 | * | 12/1969 | Conterno | 74/543 |
| 3,693,467 | * | 9/1972 | Oehl | 74/523 |
| 5,284,400 | * | 2/1994 | Thomas | 74/543 |
| 5,943,919 | * | 8/1999 | Babinski | 74/89.15 |

* cited by examiner

Primary Examiner—David A. Bucci
Assistant Examiner—William C Joyce
(74) Attorney, Agent, or Firm—Bacon & Thomas, PLLC

(57) ABSTRACT

A gripping device equipped with a replaceable head portion which can have various artistic forms for choice according to individual preference, for use on a gear shift lever of automobiles. The gripping device made up of a head portion and a supporting case that are separably bound together by a bolt with ease is mounted to the top of a gear shift lever by a screw. The supporting case has a opened top and an axial open-ended hollow column at the center, in alignment with an engagement protrusion defined on the bottom side of the head portion of the gripping device, permitting the supporting case to be engaged with each other in assembly. There are continual axial contour grooves defined on the external surface of the supporting case in consideration of hand fitness of a driver so that the gear shift lever can be firmly and comfortably held without slip in gear shifting operation. In addition, the top of the head portion can be designed in various artistic forms to conform to individual preference.

8 Claims, 6 Drawing Sheets

GRIPPING DEVICE WITH A REPLACEABLE HEAD PORTION FOR USE ON GEAR SHIFT LEVER

BACKGROUND OF THE INVENTION

1. Field of the Invention

The present invention relates to an improved gripping device with a replaceable head portion, which can have various artistic forms of choice according to individual preference, for use on a gear shift lever of automobiles. The gripping device is made up of a head portion and a hollow supporting case that are separably bound together by a bolt and easily is fixedly mounted to the top of a gear shift lever by a screw. The supporting case has an axial open-ended hollow column at the center, in alignment with an engagement protrusion defined on the bottom side of the head portion of the gripping device, permitting the supporting case and the head portion to be engaged with each other in assembly. There are continual axial contour grooves defined on the external surface of the supporting case in consideration of hand fitness of a driver so that the gear shift lever can be firmly and comfortably held without slip in gear shifting operation. In addition, the top of the head portion can be designed in various artistic forms to conform to individual preference in purchase.

2. Description of the Related Art

In general, gear shift levers for use in manually or automatically operated transmission systems of automobiles are provided with only a gripping handle and a lever. Those gripping handles commonly produced in a shape suit for easy holding are provided with an internally threaded bottom so as to permit the handles to be removably attached to the top of corresponding levers. Such prior art gripping handles are only produced in consideration of their functional purpose without too much variation, making the overall appearance of the conventional gear shift levers look monotonous and dull.

SUMMARY OF THE INVENTION

Therefore, the primary object of the present invention is to provide an improved gripping device for use on a gear shift lever of automobiles. It is designed to have an outer contour in conformance to human hand structure, providing for gripping fitness and comfort in gear shifting operation without any possibility of slip.

Another object of the present invention is to provide an improved gripping device for use on a gear shift lever of automobiles which has a head portion provided with a variety of artistic designs for people to choose according to individual preference.

DETAILED DESCRIPTION OF THE PREFERRED EMBODIMENT

Figure 1:
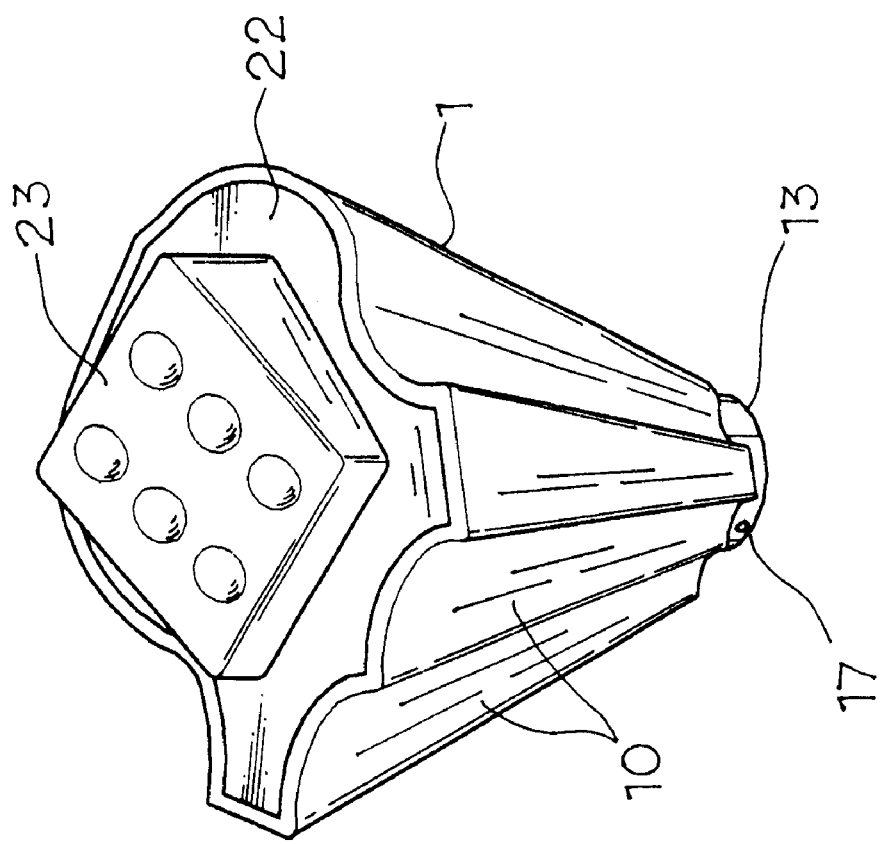
FIG. 1 is a perspective diagram showing the assembly of the present invention.
Figure 2:
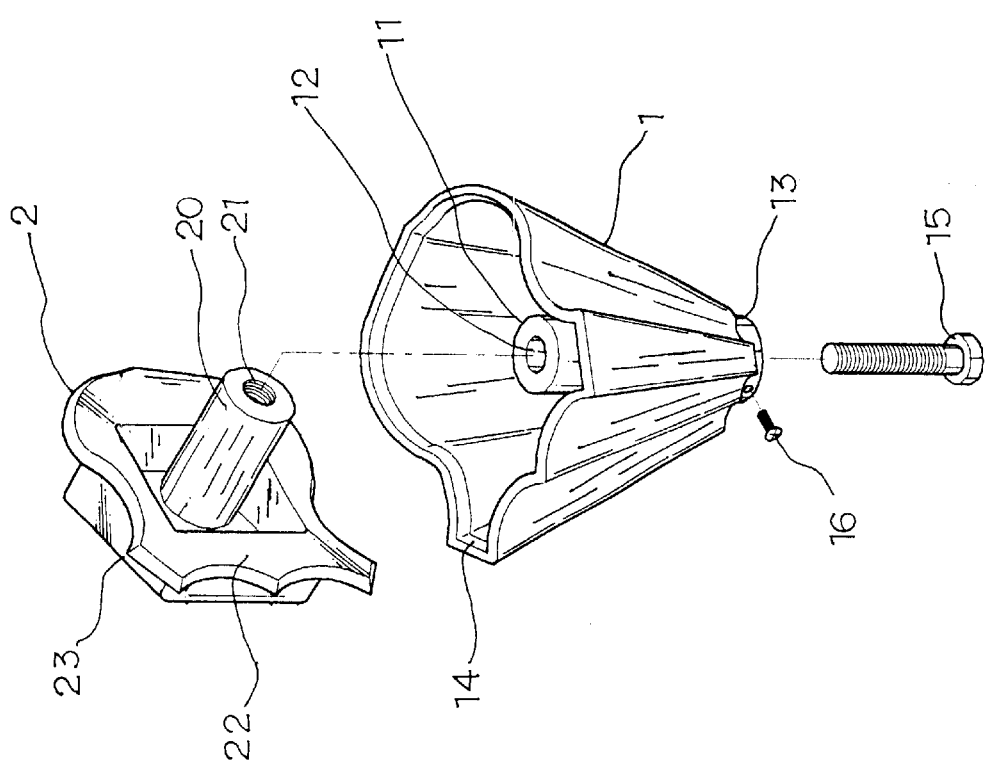
FIG. 2 is a perspective diagram showing exploded view of the components of the present invention.

Referring to FIG. 1 and FIG. 2, the gripping device of the present invention is comprised of a supporting case 1, a head portion 2. The supporting case 1 has an opened top and is substantially a hollow conic enclosure having increasingly reduced diameters from top to bottom and peripheral contour recesses 10 axially disposed in conformance to human physical structure for ready operation. At the bottom end of the supporting case 1 is disposed a retaining journal. 13 having a screw hole 17 for receiving a screw 16 which is used to lock the supporting case 1 to a gear shift lever.

At the center of the hollow supporting case 1 is axially disposed an open-ended hollow column 11 which extends a little short of the full length of the supporting case 1. The hollow column 11 has an open-ended central threaded tubular tunnel 12. Along the inner side of the top periphery of the supporting case 1 is provided with a continual retaining recess 14 for supporting the head portion 2 in place in assembly.

On the bottom side of the head portion 2 is disposed an engagement protrusion 20 having an internally threaded cavity 21 and positioned in linear alignment with the central hollow column 11 of the supporting case 1. So, the head portion 2 can be secured to the supporting case 1 by a bolt 15 led through the threaded tunnel 12 of the central column 11 of the supporting case 1 and the threaded cavity 21 of the head portion 2.

The head portion 2 has a decoration face 23 and a peripheral flange 22, which is in geometric conformance to the continual retaining recess 14 at the opened top of the supporting case 1, permitting the head portion 2 to be registered with the supporting case 1 in assembly.

Figure 3:
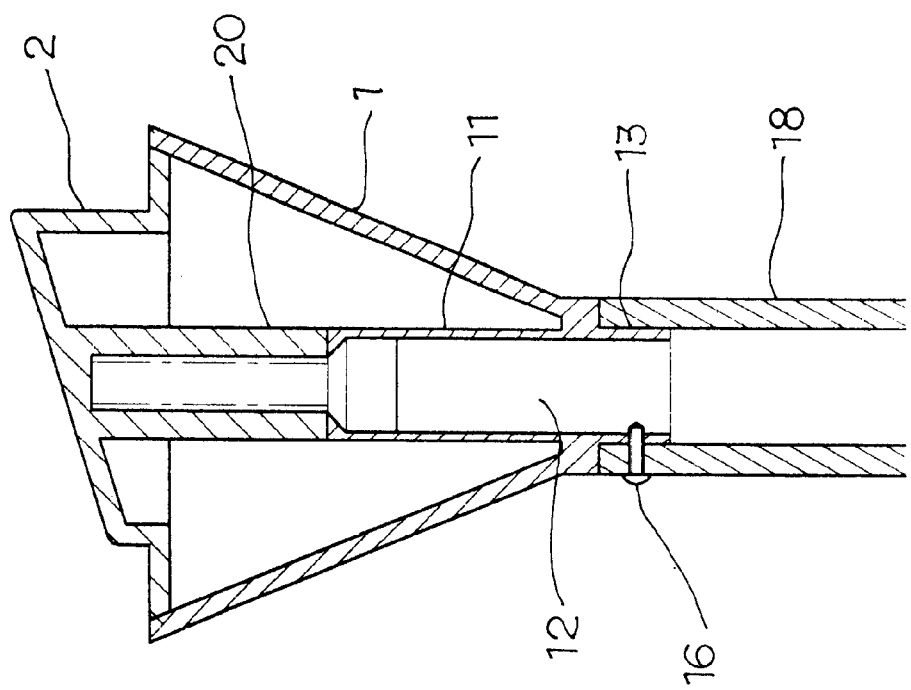
FIG. 3 is a diagram showing a sectional diagram showing the mounting of the gripping device of the present invention onto the top of a gear shift lever.
Figure 4:
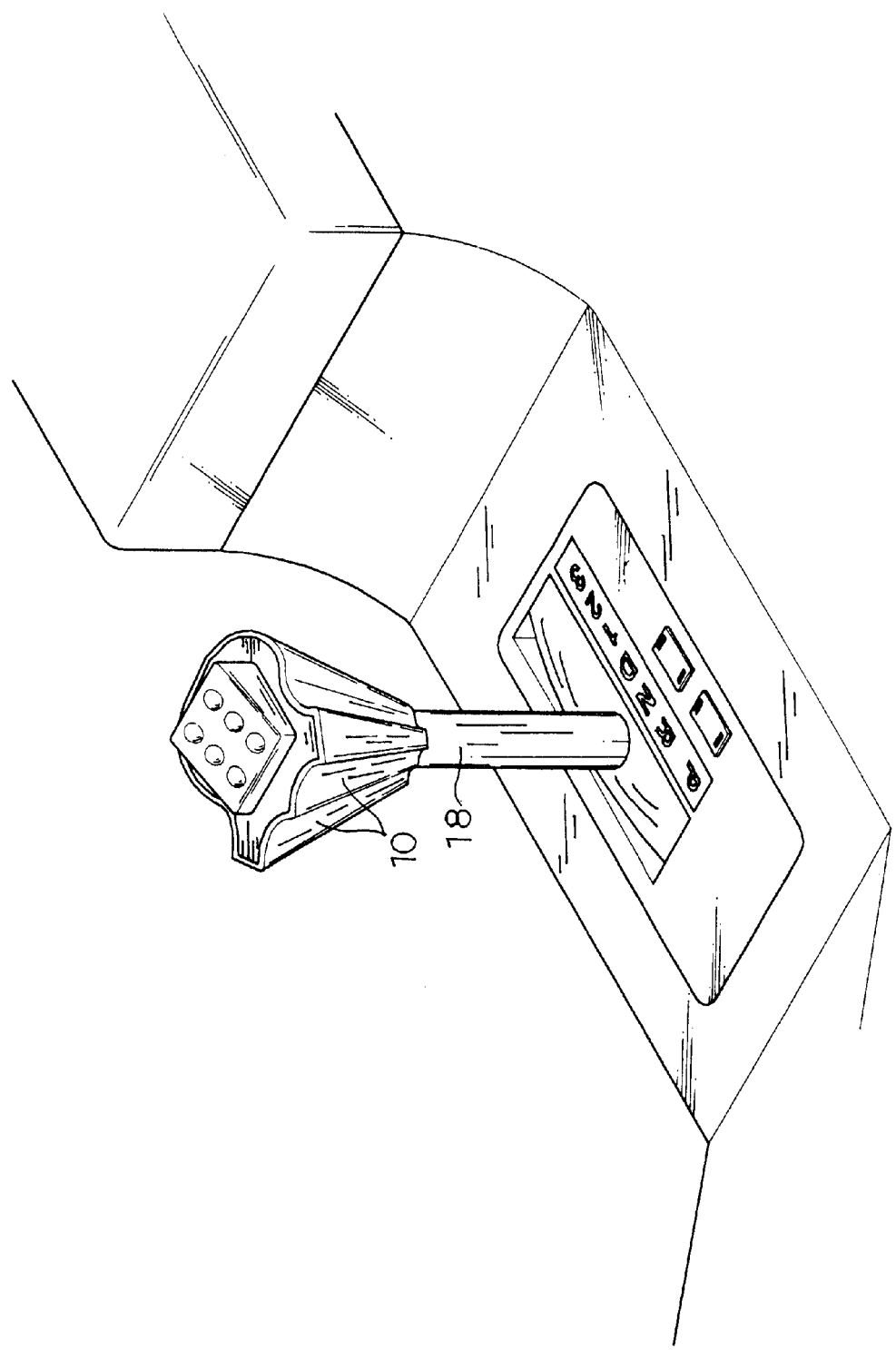
FIG. 4 is a perspective diagram showing the gripping device of the present invention mounted to a gear shift lever of an automobile.

Referring to FIGS. 3, 4, in assembly, the head portion 2 is placed in registration with the opened top of the supporting case 1 with the engagement protrusion 20 positioned in. alignment with the central hollow column 11 so that the head portion 2 can be integrally locked together with the supporting case 1 by way of the bolt 15 to obtain the gripping device of the present invention.

In practical application, the gripping device of the present invention is secured to the top of a gear shift lever by first registering the retaining journal 13 of the supporting case 1 with the top of a gear shift lever 18 and then fixing the supporting case 1 in place by the screw 16 received in the screw hole 17 of the retaining journal 13.

Figure 5:
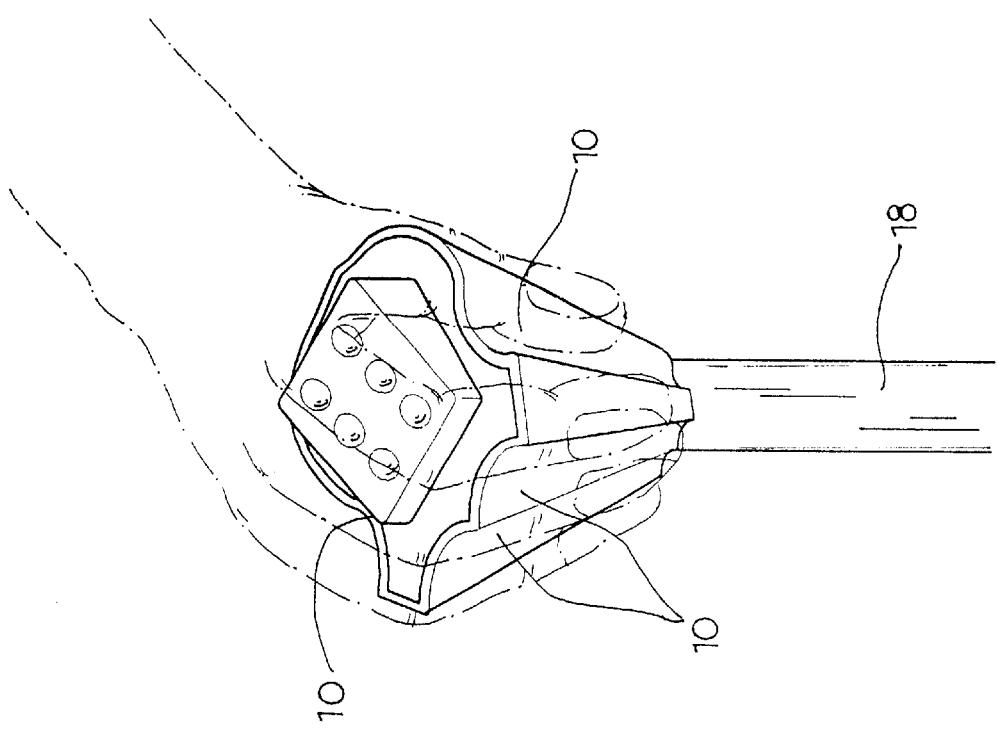
FIG. 5 is a perspective diagram showing a hand operating on the gripping device of the present invention.
Figure 6C:
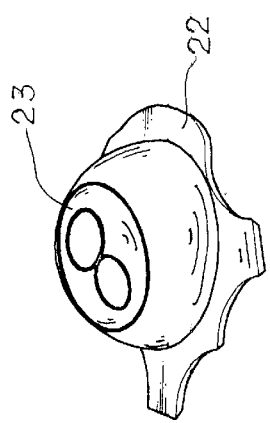
FIGS. 6A, 6B, 6C, 6D are diagrams showing the head portions of the gripping device with various artistic designs.
Figure 6D:
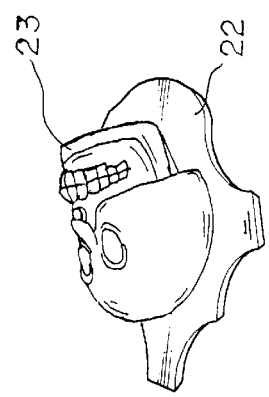
Figure 6:
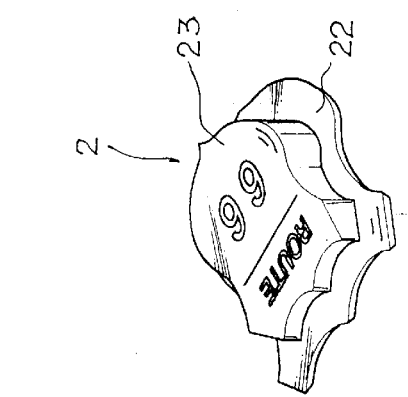
FIG. 6 is another diagram showing the exploded components of the present invention with the top of the head portion of the gripping device illustrated.
Figure 6A:
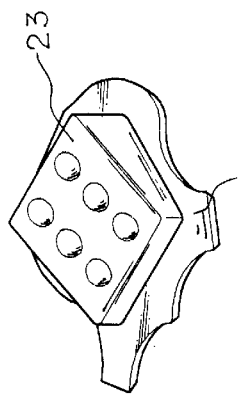
Figure 6B:
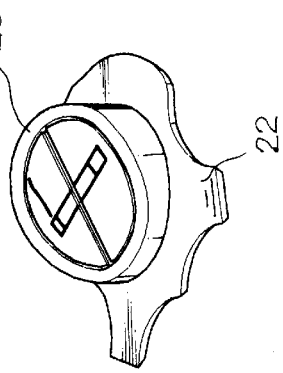

As shown in FIG. 5, the external surface of the supporting case 1 of the gripping device of the present invention is provided with multiple axially extended contour grooves 10 at the front portion thereof in conformance to the physical structure of a hand. In such a manner, the gripping device can be fitly and comfortably grasped without slip by a driver in gear shifting operation Referring to FIGS. 6, the head portion 2 and the supporting case 1 are integrally bound together by way of the bolt 15 so that they can be separated readily. As further shown in FIGS. 6, 6A–6D, the top decoration face 23 of the head portion 2 can be designed in various artistic forms and selectively engage with supporting case 1 so as to permit the gripping device of the present invention to meet customers' different preference.

In summary, the gripping device of the present invention is easy to be assembled and disassembled so as to permit head portions having various decoration faces to be selectively bound with the supporting case in conformance to individual preference in one aspect. And the anti-slip contour grooves at the front portion of the external surface of the supporting case makes the grasp of a gear shift lever in a more secure manner.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

I claim:

1. A gripping device for use on a gear shift lever of automobile, the gripping device comprising:
    a hollow supporting case;
    a head portion;
    said head portion having a decoration face and a non-circular peripheral flange;
    said hollow supporting case having a non-circular opened top and a retaining journal at a bottom end thereof;
    said peripheral flange of said head portion being designed to conform to a geometric shape of said opened top of said supporting case so as to permit said head portion to be integrally registered with said opened top of said hollow supporting case;
    said retaining journal of said supporting case removably engageable with a top of a gear shift lever by a retaining device;
    a fixing device connected to said head portion for fixing said head portion to said supporting case, whereby said head portion may be selected to have various artistic decorative faces according to individual preference, said head portion has an engagement protrusion having an internally threaded cavity and said supporting case has an axially extended hollow column;
    said hollow column extends slightly less than the full axial length of said supporting case; and
    said opened top of said supporting case comprising a peripheral recess for receiving said peripheral flange of said head portion so as to permit said engagement protrusion of said head portion to be in linear alignment with said hollow column and integrally bound together by a bolt.

2. The gripping device as claimed in claim 1, wherein said retaining journal comprises a screw hole that permits said supporting case of said gripping device to be securable to a top of a gear shift lever by fixing a screw into said screw hole.

3. The gripping device as claimed in claim 1, wherein said retaining journal is slidably engageable inside an open top of the gear shift lever.

4. The gripping device as claimed in claim 3, wherein said retaining journal includes a shoulder for abutting an end face of an open top of the gear shift lever.

5. The gripping deice as claimed in claim 1, wherein said retaining journal is slidably engageable inside an open top of the gear shift lever.

6. The gripping device as claimed in claim 5, wherein said retaining journal includes a shoulder for abutting an end face of an open top of the gear shift lever.

7. The gripping device as claimed in claim 2, wherein said retaining journal is slidable engageable inside an open top of the gear shift lever.

8. The gripping device as claimed in claim 7, wherein said retaining journal includes a shoulder for abutting an end face of an open top of the gear shift lever.

* * * * *